United States Patent
Silakov (10) Patent No.: US 12,061,536 B1
(45) Date of Patent: Aug. 13, 2024

(54) SYSTEMS AND METHODS FOR IDENTIFYING AN OPTIMAL SET OF LOG FILES FOR PROBLEM ANALYSIS

(71) Applicant: Virtuozzo International GmbH, Schaffhausen (CH)

(72) Inventor: Denis Silakov, Moscow (RU)

(73) Assignee: Virtuozzo International GmbH, Schaffhausen (CH)

( * ) Notice: Subject to any disclaimer, the term of this patent is extended or adjusted under 35 U.S.C. 154(b) by 115 days.

(21) Appl. No.: 17/583,297

(22) Filed: Jan. 25, 2022

Related U.S. Application Data (63) Continuation-in-part of application No. 17/085,994, filed on Oct. 30, 2020, now Pat. No. 11,231,986.

(51) Int. Cl.
*G06F 11/00* (2006.01)
*G06F 11/36* (2006.01)

(52) U.S. Cl.
CPC .................................. *G06F 11/3636* (2013.01)

(58) Field of Classification Search
CPC ............. G06F 11/3636; G06F 11/3604; G06F 11/3612; G06F 11/362; G06F 11/302; G06F 11/3051
See application file for complete search history.

(56) References Cited

U.S. PATENT DOCUMENTS

| | | | | |
|---|---|---|---|---|
| 7,739,374 B1* | 6/2010 | Frey | ................... | G06F 11/3636 709/224 |
| 8,997,057 B1* | 3/2015 | Diwan | ................ | G06F 11/3409 717/124 |
| 2007/0283338 A1* | 12/2007 | Gupta | .................... | G06F 11/36 717/154 |
| 2020/0334093 A1* | 10/2020 | Dubey | ................ | G06F 11/0778 |
| 2021/0149790 A1* | 5/2021 | Renner | ............... | G06F 11/0778 |
| 2023/0214409 A1* | 7/2023 | Tozawa | .................... | G06F 8/77 707/740 |

* cited by examiner

*Primary Examiner* — Joseph D Manoskey
(74) *Attorney, Agent, or Firm* — ArentFox Schiff LLP; Michael Fainberg (57) ABSTRACT

Disclosed herein are systems and methods for identifying an optimal set of log files for problem analysis. In one aspect, a method may comprise receiving, by at least one computing device, a function call trace comprising a sequence of functions executed in a software component; computing similarity values between the received function call trace and each known call trace of a plurality of known call traces, wherein each respective known call trace of the plurality of known call traces is associated with a respective set of log file names; creating a resulting set of log file names based on a union of respective sets of log file names associated with those respective known call traces of the plurality of known call traces, for which the respective similarity values are greater than a threshold similarity value; and receiving a set of log files based on the resulting set of log file names.

20 Claims, 4 Drawing Sheets

SYSTEMS AND METHODS FOR IDENTIFYING AN OPTIMAL SET OF LOG FILES FOR PROBLEM ANALYSIS

CROSS-REFERENCE TO RELATED APPLICATIONS

This application is a continuation-in-part of U.S. Non-Provisional application Ser. No. 17/085,994, filed on Oct. 30, 2020, which is herein incorporated by reference.

FIELD OF TECHNOLOGY

The present disclosure relates to the field of software problem analysis, and, more specifically, to systems and methods for identifying and analyzing an optimal set of log files for generating problem reports.

BACKGROUND

Software programs commonly have bugs that lead to abnormal software component (e.g., application or system tool) behavior and crashes under certain conditions. To effectively analyze such problems, it is important to quickly react to the errors and detected problems and collect information needed for debugging. Most crashes occur during the development cycle of the software component (e.g., application), when the software component (e.g., application) is subjected to different tests for stability and performance. Some crashes occur on the customer's side, when the software is already released to production. In both cases, crashes are analyzed by developers to identify and fix the underlying problems.

For such an analysis to be effective, it is important to collect comprehensive information about the incident such as software component (e.g., application) name, arguments, environment variables, function call trace, etc. This information forms a problem report An important component of problem reports are log files (or journal files) of the application and/or the system as a whole. Log files help to identify what was happening in the operating system and inside the application itself when a problem occurred.

In modern systems, however, the size and the number of journals and log files can be significantly large—containing several gigabytes of textual data. It is unreasonable to collect all possible log files for every problem (e.g., a crash) because this increases the size of problem reports and does not necessarily help developers to find the issue. In fact, due to the overwhelming size of data, collecting and analyzing all possible log files may make it even more difficult to debug.

Accordingly, there exists a need to select, for a particular problem, a set of log files that can decrease the amount of information collected for crash analysis without missing important data.

SUMMARY

As software systems grow in complexity and size, the number of possible problem scenarios is also dramatically increasing. It would take a significant amount human resources to manually specify sets of logs files that should be collected in every possible case, especially for system-wide tools where developers do not have control over the code of programs that run in the system.

To address these shortcomings, aspects of the disclosure describe methods and systems for identifying optimal set of log files for problem analysis. More specifically, the methods and systems automatically analyze if data in the log file is useful for problem analysis or not.

In one exemplary aspect, the techniques described herein relate to a method for identifying a set of log files for problem analysis, the method including: receiving, by at least one computing device from a second computing device, a function call trace including a sequence of functions executed in a software component within a period of time on the second computing device; for the received function call trace, computing similarity values between the received function call trace and each known call trace of a plurality of known call traces, wherein each respective known call trace of the plurality of known call traces is associated with a respective set of log file names; creating a resulting set of log file names based on a union of respective sets of log file names associated with those respective known call traces of the plurality of known call traces for which respective similarity values are greater than a threshold similarity value; sending the resulting set of log file names to the second computing device; and receiving, from the second computing device, a set of log files for the second computing device based on the resulting set of log file names.

In some aspects, the techniques described herein relate to a method, wherein an amount of log files in the received set of log files is less than an amount of total log files retrievable for a problem for the period of time.

In some aspects, the techniques described herein relate to a method, wherein computing the similarity values between the received function call trace and each known call trace includes: determining, for each respective known call trace of the plurality of known call traces, a respective similarity value using a comparison algorithm that accepts inputs including: (1) positions of common functions in the respective known call trace and the received function call trace, and (2) differences in positions of common functions in the respective known call trace and the received function call trace.

In some aspects, the techniques described herein relate to a method, further including: prior to comparing the received function call trace with the plurality of known call traces, obtaining parameters of the comparison algorithm, wherein the parameters include a distance weight, an alignment offset weight, and the threshold similarity value.

In some aspects, the techniques described herein relate to a method, further including: iteratively determining the distance weight, the alignment offset weight, and the threshold similarity value using a machine learning algorithm configured to: compare at least one test call trace with the plurality of known call traces, wherein required sets of log files of the at least one test call trace are pre-identified; and adjust the distance weight, the alignment offset weight, and the threshold similarity value such that an output of the comparison algorithm is indicative of the required sets of log files.

In some aspects, the techniques described herein relate to a method, further including prior to computing the similarity values, removing recursive function calls from the received function call trace.

In some aspects, the techniques described herein relate to a method, further including prior to computing the similarity values, unifying functions in the received function call trace that have corresponding bodies.

In some aspects, the techniques described herein relate to a method, further including prior to computing the similarity values, appending to the received function call trace at least one of a name, a version of the software component, and a name of RPM package of the software component.

It should be noted that the methods described above may be implemented in a system comprising a hardware processor. Alternatively, the methods may be implemented using computer executable instructions of a non-transitory computer readable medium.

In some aspects, the techniques described herein relate to a system for identifying a set of log files for problem analysis, including: a hardware processor configured to: receive, by at least one computing device from a second computing device, a function call trace including a sequence of functions executed in a software component within a period of time on the second computing device; for the received function call trace, compute similarity values between the received function call trace and each known call trace of a plurality of known call traces, wherein each respective known call trace of the plurality of known call traces is associated with a respective set of log file names; create a resulting set of log file names based on a union of respective sets of log file names associated with those respective known call traces of the plurality of known call traces for which respective similarity values are greater than a threshold similarity value; send the resulting set of log file names to the second computing device; and receive, from the second computing device, a set of log files for the second computing device based on the resulting set of log file names.

In some aspects, the techniques described herein relate to a non-transitory computer readable medium storing thereon computer executable instructions for identifying a set of log files for problem analysis, including instructions for: receiving, by at least one computing device from a second computing device, a function call trace including a sequence of functions executed in a software component within a period of time on the second computing device; for the received function call trace, computing similarity values between the received function call trace and each known call trace of a plurality of known call traces, wherein each respective known call trace of the plurality of known call traces is associated with a respective set of log file names; creating a resulting set of log file names based on a union of respective sets of log file names associated with those respective known call traces of the plurality of known call traces for which respective similarity values are greater than a threshold similarity value; sending the resulting set of log file names to the second computing device; and receiving, from the second computing device, a set of log files for the second computing device based on the resulting set of log file names.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for identifying optimal set of log files for problem analysis. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
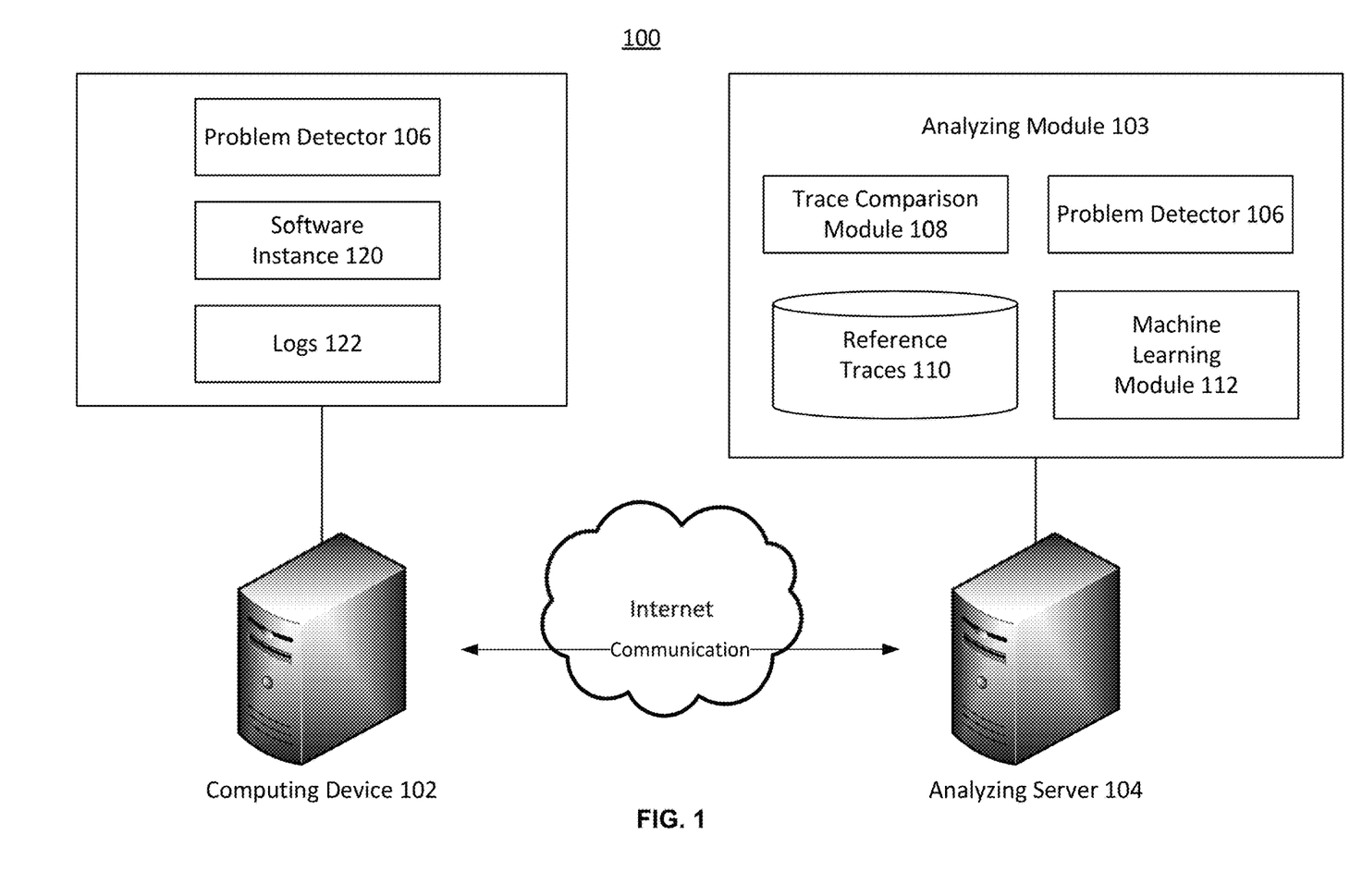
FIG. 1 is a block diagram illustrating a system for identifying an optimal set of log files for generating problem reports.

FIG. 1 is a block diagram 100 illustrating a system for identifying an optimal set of log files for problem analysis. The system may comprise an analyzing server 104 (which may be represented by a computing device) or a number of analyzing servers (e.g., represented by a plurality of different computing devices, such as for example, distributed systems or multiple servers utilized to perform operations "over the cloud"). In some aspects, analyzing server 104 may communicate with one or more computing devices 102, which, in different aspects, may or may not be a part of the system for identifying the optimal set of log files for problem analysis, depending on an aspect. In some aspects, the analyzing server 104 and the computing device 102 may be communicatively coupled to each other, communicate with each other, send requests/reports to each other, or be connected via a network (e.g., the Internet), etc. The analyzing server 104 may run an analyzing module 103 (or at least some parts of the module) for identifying the optimal set of log files for problem analysis. Computing device 102 may be any device running a software program instance 120 (e.g., a software component), where a software problem may occur. Example computing devices include but are not limited to computers, servers, laptops, smartphones, smart speakers, and other physical computing devices. When a problem is detected on computing device 102, a function call trace comprising a sequence of functions executed in a software component instance 120 on the computing device 102 within a period of time is sent to the analyzing server 104. By a request from an analyzing server 104, in one aspect, the problem report or various log files are transmitted to analyzing server 104. Analyzing server 104, although depicted as a server, may be any device that is capable of receiving logs, problem reports, function call traces, etc., and, optionally, storing and further analyzing or presenting them. In one aspect, for example, the analyzing server 104 may present the log files (e.g., the identified optimal set of log files related to the problem) to the developer of the software that experienced a problem on computing device 102. So that, the developer may then identify the issues in the installed version of the software on computing device 102 and release a patch that resolves the identified issues.

In one aspect, the computing device 102 runs a software program instance 120. In one aspect, the computing device 102 sends requests and/or information to the analyzing server 104. In one aspect, the computing device 102 includes problem detector 106, which is a component that detects problems (e.g., unpredictable behavior of the software program instance 120) on the computing device 102, and in response to detection of a problem sends one or more function call traces to the analyzing server 104. In one aspect, the computing device 102 comprises logs 122 (e.g., logs of the operating system of the computing device 102, or logs of the software program instance 120, etc.). In one aspect, in response to receiving from the analyzing server 104 a set on log file names, the computing device 102 sends log files corresponding to the received log file names to the analyzing server 104. In one aspect, problem detector 106 may receive an indication that a problem has occurred on computing device 102. Problems may include a crash (e.g., a software has terminated when it should not have), a freeze (e.g., a software is unresponsive to any inputs), lack of resources, or any other malfunction where the software has shown an unexpected outcome. Problem detector 106 may retrieve a function call trace comprising a sequence of functions executed in the software associated with the error.

In one aspect, the analyzing server 104 runs an analyzing module 103 for identifying an optimal set of log files for problem analysis. Analyzing module 103 may include a plurality of components or sub-modules such as one or more of: problem detector 106, trace comparison module 108, reference traces 110 (e.g., a plurality of known call traces), and machine learning module 112. In one aspect, the learning module 112 is not running on the analyzing server, but is available for the analyzing server via a network. In one aspect, learning module 112 provides an analyzing server 104 with parameters for algorithm of trace comparing and computing similarity values. In one aspect, trace comparison module 108 is a module that computes similarity values between the received function call trace and each known call trace of a plurality of known call traces, stored on the at least one computing device, wherein each respective known call trace of the plurality of known call traces is associated with a respective set of log file names. In one aspect, trace comparison module 108 compares the retrieved function call trace with a plurality of known call traces stored in reference traces 110 based on distance and alignment offset between functions in the respective call traces, and outputs a set of log file names (e.g., names of log files) to be included in a problem report. Module 108 may perform calculations using a comparison algorithm (e.g., a position dependent model (PDM) or any other algorithm usable to measure similarity between two stack traces). To improve the ability of a comparison algorithm (e.g., PDM) to compare traces, the parameters of the comparison algorithm (e.g., PDM) are optimized using machine learning module 112. In one aspect, the analyzing server 104 collects the needed log files (i.e., optimal set of log files; e.g., names of which were identified by the module 108) by sending the resulting list of log file names to the computing device 102 and receiving the mentioned log files from the computing device 102 as a response.

In one aspect, the problem report including the optimal set of log files is generated by analyzing server 104, which receives the identified logs and puts them (the log files with all their content) in the report, and, optionally, additionally, formalizes them during adding into the report.

In one aspect, in response to detecting a problem, computing device 102 may transmit a function call trace associated with the problem to analyzing server 104. Analyzing server 104 may use the components such as trace comparison module 108 and respond to computing device 102 with an indication of the logs that should be collected and send back.

In one aspect, a complete set of all log files (from which the optimal set is collected) that can be collected may be predefined by developers and may depend on the nature of the software component (e.g., whether the software component is an application or a system component, or depending the language on which the software component is written, or the purpose for which the component is used for, etc.). In one aspect, it also may depend on which log files are available in the computing environment in which the software component runs. In case of tools aimed to collect data for a certain software application (e.g., Mozilla Crash Reporter which is launched once Firefox browser closes unexpectedly), this set includes logs of application and some general system information (e.g., operating system name and version, hardware properties, etc.). On the opposite end, system-wide tools aimed to detect crashes of any process in the operating system (e.g., Windows Error Reporting service or RedHat Automatic Bug Reporting Tool) can collect memory dump of the failed process. In one aspect, the available logs may include any journals, either system or specific to a particular application. To make problem reports more useful, it is necessary to analyze which available information is really required for analysis, which data is superfluous, and which should be added, i.e., the module 103 shall determine which log files from all available/collectable log files are really needed.

In many existing tools, there is some flexibility in choosing data to be included into the problem report depending on incident details. For example, if problematic program is written in Java or Python then Java or Python Runtime Environment are requested correspondingly for a problem trace of the failure. However, such logic is programmed by developers on the basis of their own experience or requests from other interested parties—that is, if during problem analysis developers discover that for certain kind of problems it would be useful to collect some additional files then they explicitly request adding such files to the problem reports in certain cases.

As software systems grow in complexity and size, the number of possible problematic scenarios is also dramatically increasing. It would take too many human resources to manually specify sets of logs files that should be collected in every possible case, especially for system-wide tools where developers do not have control over the code of programs that run in the system. So there is a need to automatically analyze if data included in the reports is useful or not in every particular case.

In one aspect, on computing device 102, problem detector 106 may detect a problem in a software instance 120 (e.g., application (e.g., a web browser) or a system component (e.g., driver)). In response to detecting the problem, problem detector 106 may retrieve a function call trace comprising a sequence of functions executed in the software component within a period of time prior to the problem.

In one aspect, to distinguish one problem report from another, the function call trace (also referred as problem trace) may be used as a unique problem identifier. The function call trace represents a sequence of function names which were called just before the problem occurred. In some aspects, the absolute or relative addresses of the functions, and/or the values of function arguments are taken into account by module 108.

In one aspect, trace comparison module 108 may compare, using a comparison algorithm (e.g., PDM or any other algorithm), the retrieved function call trace with a plurality of known call traces stored in reference traces 110, wherein each respective known call trace of the plurality of known call traces is associated with a respective set of log files to be collected for problem analysis. In one aspect, trace comparison module 108 may compute similarity values between the received function call trace and each known call trace of a plurality of known call traces, stored on the at least one computing device, wherein each respective known call trace of the plurality of known call traces is associated with a respective set of log file names. In one aspect, the algorithm may use, for example, at least one of the two characteristics: (1) distance to the top frame, which is the position of a function in the trace, and (2) alignment offset, which is the difference in position of the same function in traces to be compared. In one aspect, this is done for each function that is present in both traces (e.g., for which the similarity value is computed). In one aspect, the algorithm is a PDM, which uses both. In some aspects, the algorithm may require recursive function calls to be removed from the trace. Accordingly, prior to comparing call traces, trace comparison module 108 may remove recursive function calls from the retrieved function call trace by truncating the call trace once a recursive function call is met.

Figure 2:
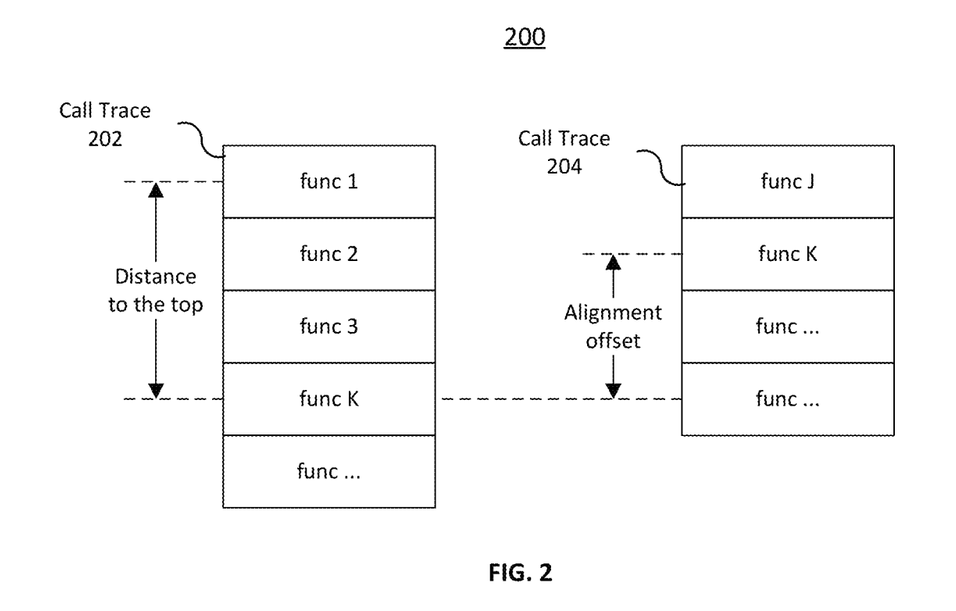
FIG. 2 is a diagram illustrating distance and alignment offset determination.

FIG. 2 is diagram 200 illustrating distance and alignment offset determination. In FIG. 2, two function call traces are depicted. The first is call trace 202, which may be received by the analyzing server 104, and the other is call trace 204, which may be one of reference traces 110 (e.g., known call traces that, in one aspect, may be a set of basic call traces for known problems for which sets of optimal log files are already known). Trace comparison module 108 may determine, for each respective known call trace of the plurality of known call traces (e.g., in reference traces 110) its similarity to the newly received function call trace. For example, using the comparison algorithm (e.g., PDM), module 108 may identify the positions of functions in the respective known call trace and the received function call trace, and may determine differences in positions of shared/common (i.e., those that are included in both compared stacks) functions in the respective known call trace and the retrieved function call trace.

As shown in FIG. 2, call trace 202 and call trace 204 both include function K. Distance is counted on the basis of common function subsequences. Thus, for every common function, the comparison algorithm can be used to calculate a distance to the top of the trace and an alignment offset between traces. These values are included in the distance formula with weights. In some aspects, machine learning module 112 is used to select optimal values for these weights. In FIG. 2, the distance to the top in call trace 202 for function K is 4. The alignment offset between function K in call trace 202 and call trace 204 is 2. The distance to the top in call trace 204 for function K is 2.

In case where the comparison algorithm is a PDM, functions with lower distance gets higher weight during comparison. Similarity between two call traces $C_1$ and $C_2$ is defined as follows. Let L be the set of all the common sequences of function names between trace 202 and 204. Let $L_i$ be one of the common sequences comprising $f_{i1}$, $f_{i2}, \ldots, f_{ik}$ matched functions:

$$L = \{L_1, L_2, L_3, \ldots\}$$

$$L_i = \{f_{i1}, f_{i2}, \ldots, f_{ik}\}$$

Let $\text{Pos}(C_q, f_{ik})$ be the position of function $f_{ik}$ in the problem trace $C_q$, l be the minimum of the number of function in traces $C_1$ and $C_2$. The similarity between the problem traces $C_1$ and $C_2$ is then defined using the following equation:

$$sim(C1, C2) = \frac{\max Li \in L(Q(Li))}{\sum_{j=1}^{l} e^{-cj}},$$

where l is a minimum number of functions in $C_1$ and $C_2$, and $$Q(Li) = \Sigma_{fik \in Li} e^{-c \, min(Pos(C1,fik),Pos(C2,fik))} * e^{-o|Pos(C1,fik)-Pos(C2,fik)|},$$

Here c is a weight for the distance and o is a weight for the alignment offset. As discussed previously, these weights are learned using machine learning module 112.

In one aspect, the machine learning module 112 is used to compute parameters and/or weights for the comparing algorithm. For example, the computation is performed based on the training set of data—set of call traces with the sets of names of log files that have been associated with the traces.

Consider an example in which $C_1$ is $\{f_1, f_2, f_3\}$ and $C_2$ is $\{f_2, f_1, f_3\}$, there are two common subsequences ($f_1$, $f_3$ and $f_2$, $f_3$). For any of them, similarity gets the following value:

$$sim(C1, C2) = \frac{e^{-c} * e^{-o} + e^{-3c}}{e^{-c} + e^{-2c}},$$

and whichever non-negative values for c and o are set, the similarity will always be less than 1. Nevertheless, the values for c and o weights need to be optimized and set to handle not so obvious cases.

In some aspects, generating all possible common subsequences and calculating Q(L) for them has exponential complexity as a worst case number of such subsequences is equal to $2^N - 1$, where N is the length of the largest trace. With N=10, this is quite acceptable, but with N=30 (not a rare case for real traces), calculation can become rather long.

Accordingly, for lengthy traces (e.g., where N is greater than a threshold size), module 108 calculates a similarity matrix M, which is defined of $N_1 \times N_2$ size, where $N_1$ is the length of $C_1$ and $N_2$ is the length of $C_2$. Every element M[i,j] represents the similarity between two subsequences. The first subsequence is from the beginning to the i-th element in $C_1$ (e.g., designated as $f_{1i}$), and the second one is from the top frame to the j-th function in $C_2$ (e.g., $f_{2j}$).

To get similarity value sim(C1, C2), module 108 calculates $M[N_1, N_2]$ element of the matrix. This calculation, which has a complexity of $N_1 \times N_2$, is performed progressively using the following formula:

$$M[i,j] = \max(M[i-1,j], M[i,j-1], M[i-1,j-1] + \text{cost}(i,j)),$$

where cost(i,j) is set to 0 if $f_{1i} == f_{2j}$, otherwise it is calculated as $$\text{cost}(i,j) = e^{-c*min(i,j)} * e^{-o*|i-j|}$$

In some aspects, in order to find similarity between the given function call trace and set of known traces, module 108 pre-processes the function call trace to make it suitable for the comparison algorithm and to eliminate items which are not important for similarity analysis but can only increase work time of the algorithm. For example, as mentioned previously, recursive function calls are eliminated by truncating the trace once the same function is met. In some aspects, module 108 unifies functions in the retrieved function call trace that have corresponding bodies. For example, names of functions known to have similar bodies are unified because some functions can be simple wrappers around the same routine or have minor differences in functionality. In some aspects, module 108 may append name and/or version of the software component, and some additional information (e.g., an RPM package of the software component, etc.) to the retrieved function call trace (e.g., to the top of the call trace). The latter step is performed to make traces of the same process or processes from the same software component (e.g., application) to have traces with higher similarity than with processes of other components. The rationale is that often set of logs that should be collected for problem analysis depend on the software component application name.

In some aspects, subsequent to the function call trace being normalized using some (e.g., one, all or none, etc.) of these pre-processing steps, the comparison algorithm (e.g., PDM) is used by module 108 to compare the function call trace with known traces in reference traces 110 (i.e., calculate its similarity values with every trace from the known set using the PDM approach discussed above). Module 108 then identifies, based on the comparison, one or more known call traces for which a similarity value with the retrieved function call trace is greater than a threshold similarity value R.

The analyzing server 104 subsequently collects (e.g., sends names of needed files to the computing device 102 and receives the log files as a response) a set of log files (i.e., files themselves) for the problem based on an associated set of log files (names of files to be collected) for the known call trace. In one aspect, the collected set of log files comprise usage information of the software component. Because only the log files of relevance to a particular problem are collected, an amount of log files in the collected set of log files is less than an amount of total log files retrievable for the problem for the period of time. In one aspect, the analyzing server 104 then generates a problem report comprising the collected set of log files. For example, a virtual machine process may crash and files of this VM may be located on distributed storage. In the event of VM process crashes, all logs related to the hypervisor and the logs related to storage can be collected. However, if the VM was not performing any operations with disk I/O, then the storage logs are not required.

In one aspect, a resulting set of log file names is created based on a union or an intersection of respective sets of log file names associated with those respective known call traces of the plurality of known call traces, for which the respective similarity values are greater than a threshold similarity value.

In some aspects, there may be multiple known traces that have a similarity value greater than the threshold similarity value. Accordingly, a union of all logs associated with the identified known traces are collected. The union for function call trace $C_k$ can be represented as $$Logs(Ck) = \bigcup_{j: sim(Cj, Ck) \geq R} Logs(Cj)$$

As discussed, module 108 determines and evaluates similarity using the comparison algorithm (e.g., PDM), which comprises a distance weight c, an alignment offset weight o, and the threshold similarity value R. To determine the optimal values for these weights, machine learning module 112 may be used. Module 112 iteratively determines the distance weight, the alignment offset weight, and the threshold similarity value using a machine learning algorithm configured to compare at least one test call trace with the plurality of known call traces, wherein required sets of log files of the at least one test call trace are pre-identified. The algorithm is further configured to adjust the distance weight, the alignment offset weight, and the threshold similarity value such that an output of the comparison algorithm (e.g., PDM) is indicative of the required sets of log files. In one aspect, the training via machine learning module 112 may be repeated, e.g., when a lot of new traces are collected (and optionally checked) and the set of known call traces may be expanded, or reviewed in order to exclude traces that are too close to each other.

Figure 3:
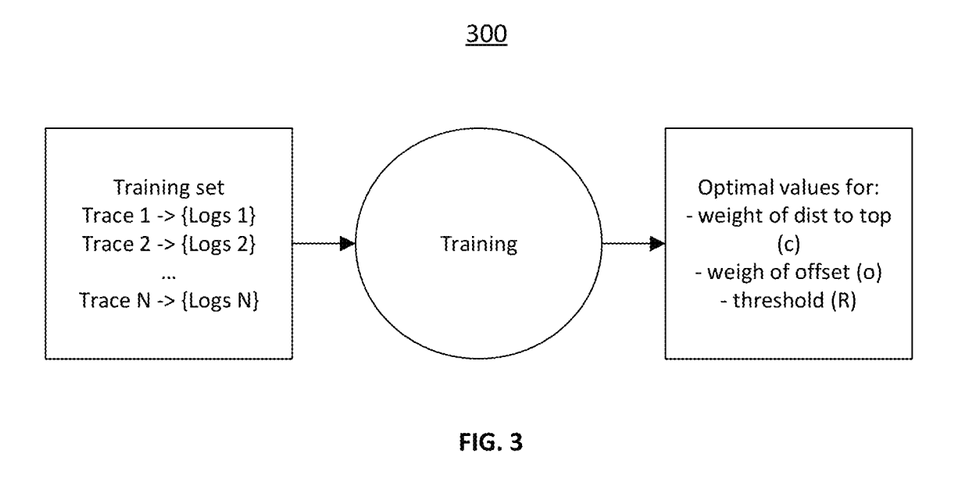
FIG. 3 is a diagram illustrating training via the machine learning module.

FIG. 3 is diagram 300 illustrating training via machine learning module 112. A training set comprises traces and their respective identified logs (e.g., names of those logs, that are deemed useful for solving this problem) are entered in machine learning module 112, which outputs the optimal values of c, o, and R. Values of c, o and R vary independently. To find their optimal values, machine learning module 112 may implement a search-based algorithm which exhaustively checks different possible combinations of these parameters.

In one aspect, machine learning module 112 may run three nested loop cycles for c, o and R correspondingly. In every cycle, possible values in a range for a corresponding parameter are iterated with some small step. For every combination of coefficient values, machine learning module 112 calculates similarities between all traces from a training set and estimates a satisfaction value with the results. For the latter purpose, machine learning module 112 uses a standard approach to calculate a $F_1$ score (also known as F-measure or F-score) for every result. The formula $F_B$ is $$FB = \frac{(1+B^2) * TP}{(1+B^2) * TP + B^2 * FN + FP}$$

Where TP stands for the number of true positive decisions, FN stands for the number of false negatives, and FP stands for the number of false positives. In the present disclosure, true positive means that if two traces require the same logs for analysis, then the similarity value between them is greater or equal to R. If the calculated similarity value for such traces is less than R then this is a false negative decision. Finally, false positive means that the similarity value is greater or equal to R while the traces require different logs for analysis. Depending on the value of B, the measured false negatives can either get more weight (if B>1) or be attenuated. In some aspects, instead of $F_1$ score (with B=1), $F_2$ or $F_{0.5}$ measures can be used. $F_1$ score takes values from 0 to 1, where larger values are preferred.

In one aspect, for the training process, module 112 may select a first amount of traces (e.g., 2000 traces) for which necessary log files (e.g., a list of log file names) were identified by developers of various software component. In some aspects, a second amount of traces (e.g., 1000) may be used as test data by module 112. The mean size of these traces may be 30 functions. When iterating through values of c, o and R parameters, module 112 may use a step (e.g., 0.05). If 2000 training traces are used, a step of 0.05 results in $20^3=8000$ similarity calculations.

Figure 4:
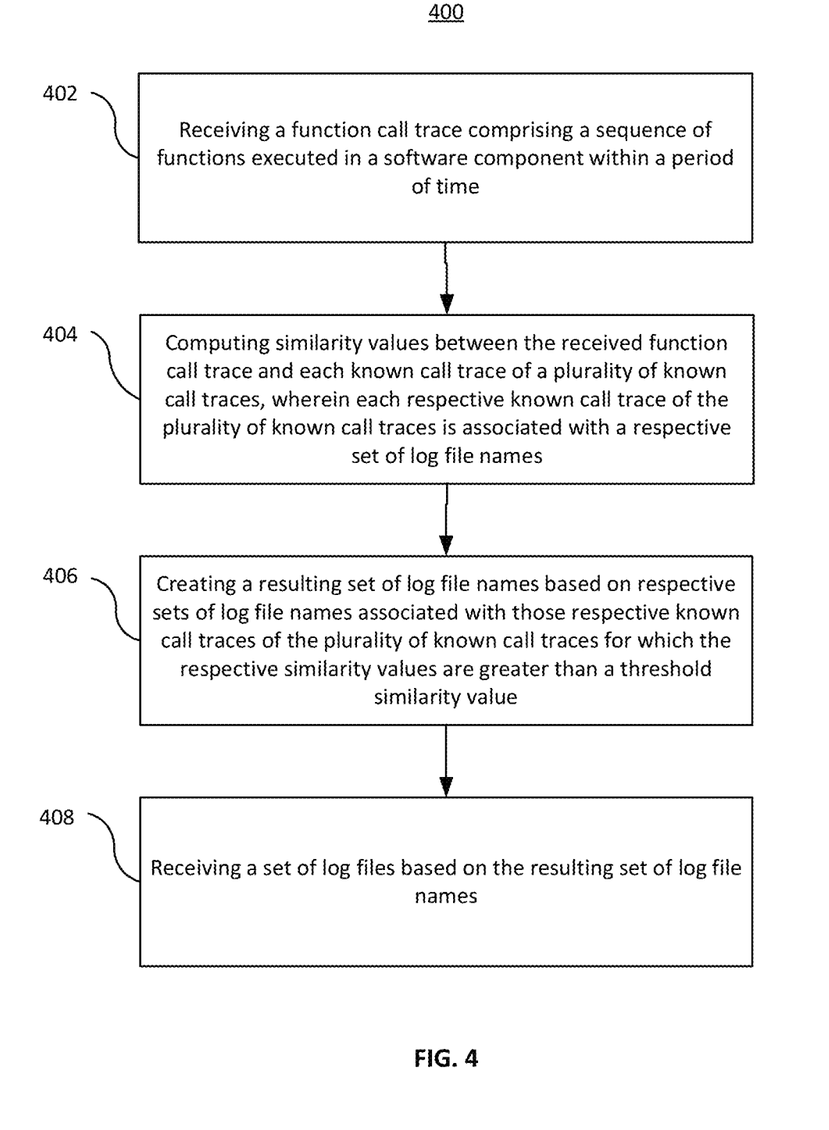
FIG. 4 illustrates a flow diagram of a method for identifying an optimal set of log files for generating problem reports, in accordance with aspects of the present disclosure.

FIG. 4 illustrates a flow diagram of method 400 for identifying optimal set of log files for problem analysis, in accordance with aspects of the present disclosure.

At 402, module 103 (or a part of it) receives a function call trace comprising a sequence of functions executed in a software component within a period of time. In one aspect, at least one computing device receives from a second computing device a function call trace comprising a sequence of functions executed in a software component within a period of time on the second computing device. In one aspect, the at least one computing device and the second computing device are communicatively coupled by a network. In one aspect, the at least one computing device and the second computing device are part of the same cluster. In another aspect, the at least one computing device and the second computing device communicate via Internet.

At 404, module 103 (or a part of it) computes similarity values between the received function call trace and each known call trace of a plurality of known call traces, wherein each respective known call trace of the plurality of known call traces is associated with a respective set of log file names. In one aspect, a plurality of known call traces is stored on the at least one computing device or is available for the at least one computing device via network. In one aspect, the computation of similarity values is done according to algorithms described in relation to FIG. 2 and FIG. 3.

At 406, module 103 (or a part of it) creates a resulting set of log file names based on respective sets of log file names associated with those respective known call traces of the plurality of known call traces, for which the respective similarity values are greater than a threshold similarity value. In one aspect, the resulting set of log file names is created based on a union or based on an intersection of the respective sets of log file names associated with those respective known call traces of the plurality of known call traces, for which the respective similarity values are greater than a threshold similarity value.

At 408, module 103 (or a part of it) receives a set of log files based on the resulting set of log file names. In one aspect, this involves sending the resulting set of log file names to the second computing device; and receiving, from the second computing device, a set of log files for the second computing device based on the resulting set of log file names.

In one aspect, the received set of log files comprise functionality and usage information of the software component within the period of time. In another aspect, a log file is a file that records either events that occur in an operating system or other software runs, or messages between different users of a communication software. In yet another aspect, log files may comprise any information about events, actions, warnings, errors, system messages, and etc. related to the computing environment, the software component, etc.

Figure 5:
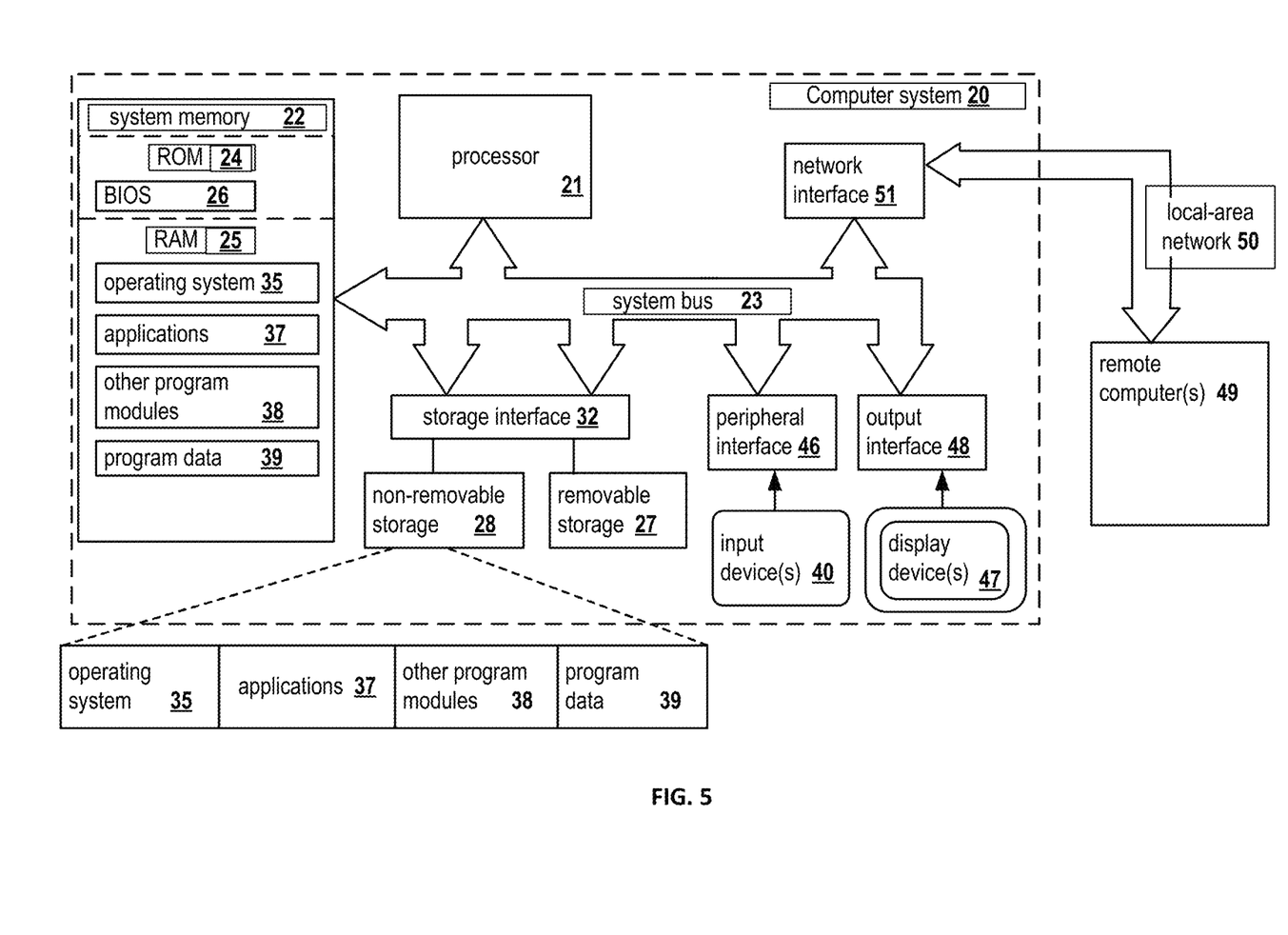
FIG. 5 presents an example of a general-purpose computer system on which aspects of the present disclosure can be implemented.

FIG. 5 is a block diagram illustrating a computer system 20 on which aspects of systems and methods for identifying an optimal set of log files for problem analysis may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RANI, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for identifying a set of log files for problem analysis, the method comprising:
   receiving, by at least one computing device from a second computing device, a function call trace comprising a sequence of functions executed in a software component within a period of time on the second computing device;
   for the received function call trace, computing similarity values between the received function call trace and each known call trace of a plurality of known call traces, wherein each respective known call trace of the plurality of known call traces is associated with a respective set of log file names;
   creating a resulting set of log file names based on a union of respective sets of log file names associated with those respective known call traces of the plurality of known call traces for which respective similarity values are greater than a threshold similarity value;
   sending the resulting set of log file names to the second computing device; and
   receiving, from the second computing device, a set of log files for the second computing device based on the resulting set of log file names.

2. The method of claim 1, wherein an amount of log files in the received set of log files is less than an amount of total log files retrievable for a problem for the period of time.

3. The method of claim 1, wherein computing the similarity values between the received function call trace and each known call trace comprises:
   determining, for each respective known call trace of the plurality of known call traces, a respective similarity value using a comparison algorithm that accepts inputs comprising:
      (1) positions of common functions in the respective known call trace and the received function call trace, and
      (2) differences in positions of common functions in the respective known call trace and the received function call trace.

4. The method of claim 3, further comprising:
   prior to comparing the received function call trace with the plurality of known call traces, obtaining parameters of the comparison algorithm, wherein the parameters comprise a distance weight, an alignment offset weight, and the threshold similarity value.

5. The method of claim 4, further comprising:
   iteratively determining the distance weight, the alignment offset weight, and the threshold similarity value using a machine learning algorithm configured to:
      compare at least one test call trace with the plurality of known call traces, wherein required sets of log files of the at least one test call trace are pre-identified; and
      adjust the distance weight, the alignment offset weight, and the threshold similarity value such that an output of the comparison algorithm is indicative of the required sets of log files.

6. The method of claim 1, further comprising prior to computing the similarity values, removing recursive function calls from the received function call trace.

7. The method of claim 1, further comprising prior to computing the similarity values, unifying functions in the received function call trace that have corresponding bodies.

8. The method of claim 1, further comprising prior to computing the similarity values, appending to the received function call trace at least one of a name, a version of the software component, and a name of RPM package of the software component.

9. A system for identifying a set of log files for problem analysis, comprising:
   a hardware processor configured to:
      receive, by at least one computing device from a second computing device, a function call trace comprising a sequence of functions executed in a software component within a period of time on the second computing device;
      for the received function call trace, compute similarity values between the received function call trace and each known call trace of a plurality of known call traces, wherein each respective known call trace of the plurality of known call traces is associated with a respective set of log file names;
      create a resulting set of log file names based on a union of respective sets of log file names associated with those respective known call traces of the plurality of known call traces for which respective similarity values are greater than a threshold similarity value;
      send the resulting set of log file names to the second computing device; and
      receive, from the second computing device, a set of log files for the second computing device based on the resulting set of log file names.

10. The system of claim 9, wherein an amount of log files in the received set of log files is less than an amount of total log files retrievable for a problem for the period of time.

11. The system of claim 9, wherein the hardware processor is configured to compute the similarity values between the received function call trace and each known call trace by:
    determining, for each respective known call trace of the plurality of known call traces, a respective similarity value using a comparison algorithm that accepts inputs comprising:
       (1) positions of common functions in the respective known call trace and the received function call trace, and
       (2) differences in positions of common functions in the respective known call trace and the received function call trace.

12. The system of claim 11, wherein the hardware processor is further configured to:
    prior to comparing the received function call trace with the plurality of known call traces, obtain parameters of the comparison algorithm, wherein the parameters comprise a distance weight, an alignment offset weight, and the threshold similarity value.

13. The system of claim 12, wherein the hardware processor is further configured to:
    iteratively determine the distance weight, the alignment offset weight, and the threshold similarity value using a machine learning algorithm configured to:
       compare at least one test call trace with the plurality of known call traces, wherein required sets of log files of the at least one test call trace are pre-identified; and
       adjust the distance weight, the alignment offset weight, and the threshold similarity value such that an output of the comparison algorithm is indicative of the required sets of log files.

14. The system of claim 9, wherein the hardware processor is further configured to prior to computing the similarity values, remove recursive function calls from the received function call trace.

15. The system of claim 9, wherein the hardware processor is further configured to prior to computing the similarity values, unify functions in the received function call trace that have corresponding bodies.

16. The system of claim 9, wherein the hardware processor is further configured to prior to computing the similarity values, append to the received function call trace at least one of a name, a version of the software component, and a name of RPM package of the software component.

17. A non-transitory computer readable medium storing thereon computer executable instructions for identifying a set of log files for problem analysis, comprising instructions for:

receiving, by at least one computing device from a second computing device, a function call trace comprising a sequence of functions executed in a software component within a period of time on the second computing device;

for the received function call trace, computing similarity values between the received function call trace and each known call trace of a plurality of known call traces, wherein each respective known call trace of the plurality of known call traces is associated with a respective set of log file names;

creating a resulting set of log file names based on a union of respective sets of log file names associated with those respective known call traces of the plurality of known call traces for which respective similarity values are greater than a threshold similarity value;

sending the resulting set of log file names to the second computing device; and receiving, from the second computing device, a set of log files for the second computing device based on the resulting set of log file names.

18. The non-transitory computer readable medium of claim 17, wherein an amount of log files in the received set of log files is less than an amount of total log files retrievable for a problem for the period of time.

19. The non-transitory computer readable medium of claim 17, wherein an instruction for computing the similarity values between the received function call trace and each known call trace comprises instructions for:

determining, for each respective known call trace of the plurality of known call traces, a respective similarity value using a comparison algorithm that accepts inputs comprising:

(1) positions of common functions in the respective known call trace and the received function call trace, and (2) differences in positions of common functions in the respective known call trace and the received function call trace.

20. The non-transitory computer readable medium of claim 19, further comprising instructions for:

prior to comparing the received function call trace with the plurality of known call traces, obtaining parameters of the comparison algorithm, wherein the parameters comprise a distance weight, an alignment offset weight, and the threshold similarity value.

\* \* \* \* \*